3,223,631
LUBRICATING COMPOSITION

Arnold J. Morway, Clark, and Alfred J. Rutkowski, Colonia, N.J., assignors to Esso Research and Engineering Company, a corporation of Delaware
No Drawing. Filed Dec. 7, 1962, Ser. No. 242,893
6 Claims. (Cl. 252—33.6)

This invention relates to lubricating compositions, their use and preparation, which compositions contain dinitriles and/or derivatives of dinitriles. Particularly, the invention relates to lubricating fluids and greases comprising lubricating oil containing metal salts of carboxylic acid and aliphatic dinitriles or their salt derivatives.

Aliphatic dinitriles are useful as lubricant additives. These dinitriles are very useful as plasticizers for greases, and for preparing greases which can change from soft greases to hard greases during shearing use, i.e., greases which shear harden. This ability to shear harden is of particular importance in the lubrication of anti-friction ball bearings. In ball bearing lubrication, a non-hardening type grease tends to churn in the rotating bearing, imparting resistance to the rotation of the bearing, thereby increasing friction and generating heat. On the other hand, when using a shear-hardening grease, the rotating ball bearings form a channel through the grease so that the grease does not impede the balls or bearing movement, thereby giving lower torque requirements, less friction and a cool running bearing. By the reduction of friction, considerably less power is required, which is particularly noticeable in long, bearing-supported gear trains. For the preceding reasons, channelling-type grease is preferred for the lubrication of anti-friction bearings for lubricated-for-life electric motors. However, during inspection of new motors, a channeling-type grease may permit loud whistling, and other bearing noises. These noises are very undesirable because it is thereby difficult to tell if the bearing is actually defective, or if the noise is normal. On the other hand, a non-channeling type grease, by churning in an operating bearing, dampens this normal bearing noise (which is usually caused by separator-flutter) so that if the bearing is still noisy, it is probably defective. One aspect of this invention involves the use of dinitrile to form grease which allows short-term initial churning of the grease in bearings to prevent bearinng noise during inspection of the bearing and motor, after which time the grease gradually becomes a channeling grease.

In addition to forming channeling-type greases as described above, the dinitrile also is useful as a plasticizer, dispersant aid, and anti-oxidant in other type greases or lubricating fluids. In brief, the aliphatic dinitrile of the invention represents a new lubricant-making material having wide utility.

The dinitrile of the invention can be represented by the general formula:

$$N\equiv C-R-C\equiv N$$

wherein R is an aliphatic hydrocarbon radical, straight chain or branched chain, saturated or unsaturated, containing about 8 to 30, preferably 8 to 20, carbon atoms. Specific examples of such dinitriles are dodecanedioic dinitrile (also known as 1,10-dicyanodecane or sebaconitrile (from sebacic acid), brassylonitrile (from brassilic acid), etc.

The dinitrile can be prepared by reacting a dicarboxylic acid with ammonia in the presence of phosphoric acid while removing water of dehydration. This reaction takes place as follows:

$$\text{HOOCRCOOH} + 2\text{NH}_3 \xrightarrow[\Delta]{\text{H}_3\text{PO}_4} \text{N}\equiv\text{C}-\text{R}-\text{C}\equiv\text{N} + 2\text{H}_2\text{O}$$

After completion of the reaction, the dinitrile is recovered and simultaneously purified by distilling dinitrile from the reaction mixture. Or, the crude reaction mixture which contains the desired dinitrile together with varying amounts of the corresponding alpha, omega aliphatic acid-nitrile, amide-nitrile, diamide, and diacid can be used.

These dinitriles will hydrolyze with water readily at elevated temperatures. Usually they are hydrolyzed by base and then split to give ammonia and the salt of the acid. In certain embodiments of the present invention, this hydrolyzation is taken advantage of to form metal salts of dicarboxylic acid or to form metal salt of a monocarboxylic acid-mononitrile, i.e., the half hydrolyzed aliphatic dinitrile which can be represented by the formula:

$$\text{HOOCRCN}$$

In any event, the dicarboxylic acid or the monocarboxylic acid, or metal salts thereof, when formed from the dinitrile, are considered as derivatives of the dinitrile for purposes of this invention.

The dinitrile can be simply dispersed in a lubricant in amounts of 0.1 to 10.4 wt. percent, e.g., 0.5 to 5 wt. percent, based on the total weight of the lubricant. The dinitriles are particularly useful with mixed-salt systems. These mixed-salt systems are best made by neutralizing 0.1 to 10, preferably 0.2 to 4.0 parts by weight of low molecular weight $C_1$ to $C_6$ fatty acid per part by weight aliphatic dinitrile. These systems can also contain salt of .1 to 20, preferably, .5 to 10 parts by weight of intermediate or high molecular weight carboxylic acid per part by weight of the dinitrile. Greases can be thus prepared containing about 10 to 45.0 weight percent, e.g., 10 to 35 weight percent of the mixed salt. These greases in turn can be diluted with additional oil to form fluid or semi-fluid compositions containing about 0.1 to 10.0% of the mixed salt. The preceding weight percents being based on the total weight of the composition.

Suitable low molecular weight acids for forming mixed salt compositions include $C_2$ to $C_6$ saturated or unsaturated, substituted and unsubstituted aliphatic mono- and polycarboxylic acids. These acids include fatty acids such a formic, acetic, propionic, furoic, and similar acids including their hydroxy derivatives such as lactic acid, etc. Acetic acid or its anhydride is preferred. Mixtures of these low molecular weight acids may be employed if desired.

Intermediate molecular weight carboxylic acids which may be used include those aliphatic, saturated or unsaturated, unsubstituted, monocarboxylic acids containing 7 to 12 carbon atoms per molecule, e.g., capric, caprylic, nonanoic, lauric acid, etc.

The high molecular weight carboxylic acid includes naturally-occurring or synthetic, substituted, or unsubstituted, saturated or unsaturated, mixed or unmixed fatty acids having about 13 to 30, e.g., 16 to 24 carbon atoms per molecule. Examples of such acids include myristic, palmitic, stearic, hydroxy stearic, such as 12-hydroxy stearic, di-hydroxy stearic, polyhydroxy stearic and other saturated hydroxy fatty acids arachidic, oleic, ricinoleic, hydrogenated fish oil, tallow acids, etc.

In addition to the normal grease-making fatty acids outlined above, saturated alphatic dicarboxylic acids of 9 to 16, preferably 10 to 14, carbon atoms can also be used.

The metal component of the mixed thickeners can be an alkaline earth metal such as calcium or barium, but for bearing lubrication is preferably an alkali metal such as sodium.

The lubricating oil used in the compositions of the invention may be either a mineral lubricating oil or a synthetic lubricating oil. Synthetic lubricating oils which may be used include esters of dibasic acids (e.g., di-2-ethylhexyl sebacate), ester of glycols (e.g., $C_{13}$ Oxo acid diester of tetraethylene glycol), complex esters (e.g., the complex ester formed by reacting one mole of sebacic acid with two moles of tetraethylene glycol and two moles of 2-ethyl-hexanoic acid), halocarbon oils, alkyl silicates, sulfite esters, mercaptals, formals, polyglycol type synthetic oils, etc., or mixtures of any of the above in any proportions. If the salts are formed in situ in the oil, then this in situ reaction is best carried out in a mineral oil, since some synthetic oils will tend to decompose or hydrolyze during the salt formation. However, the salts once formed, can be used in lubricants containing the synthetic oils noted above.

Various other additives may also be added to the lubricating composition in amounts of 0.1 to 10.0 weight percent each. Such additives include oxidation inhibitors such as phenyl-alpha-naphthylamine; corrosion inhibitors such as sorbitan monooleate, sodium nitrite; dyes; other grease thickeners; and the like.

The lubricants of the invention can be formed in a number of different ways. The most convenient way is to disperse the acids and dinitrile along with the metal base in the oil. Usually the resulting composition will then be heated to about 225° F. to 600° F., preferably 430 to 575° F. to dehydrate the composition. In general, particularly when using acetic acid or its anhydride, the higher temperature of 430 to 600° F. will result in the formation of a salt material having greater thickening effect and better load and E.P. properties than lower dehydration temperatures, e.g., 300 to 350° F.

The invention will be further understood by the following examples, which include preferred embodiments of the invention and wherein all parts are by weight.

EXAMPLE I

Part A.—Preparation of dodecanedioic dinitrile (also called 1,10-dicyanodecane).

230 grams of dodecanedioic acid and 23 g. of concentrated ortho phosphoric acid (85 wt. percent ortho phosphoric acid and 15 wt. percent water) were added to a 2-liter, four-neck flask. The flask was equipped with a stirrer, thermowell, ammonia inlet tube, and a Dean-Stark trap and condenser to remove the water of dehydration.

The flask and its contents were heated to 300° C. with a constant supply of ammonia entering the bottom of the flask at a rate of approximately 0.5 g./min. The water of dehydration was removed continuously while the temperature was maintained at 300° C. for eight hours. After eight hours, the flask was cooled to room temperature. The reaction mixture was then distilled under 0.8 mm. Hg pressure to give 160 g. of dodecanedioic dinitrile (85% yield) as a residue having a boiling point of 148° C. at 0.8 mm. Hg pressure.

Part B.—A grease composition was prepared utilizing the dodecanedioic dinitrile of Part A as prepared above. Specifically, 10 parts of Hydrofol Acids 51 and 60 parts of a mineral lubricating oil of 55 SUS viscosity at 210° F. were added to a fire-heated grease kettle and mixed while heating to 125° F. Hydrofol Acids 51 is a commercial acid obtained by hydrogenating fish oil, and has an average chain length and degree of unsaturation corresponding to stearic acid. 6 parts of sodium hydroxide in the form of a 40 wt. percent aqueous solution (i.e., 40 wt. percent sodium hydroxide and 60 wt. percent water) were added to the kettle. Immediately after adding the sodium hydroxide solution, a blend consisting of 4 parts of glacial acetic acid and 10 parts of the dinitrile of Part A were then added to the kettle. The temperature of the mixture in the kettle was then raised by heating and the following heating schedule was then observed:

HEATING SCHEDULE AFTER ADDITION OF ALL REACTANTS

| Minutes | ° F. | Remarks |
|---|---|---|
| 0 | 260 | Water coming off. |
| 15 | 390 | Dry, closed kettle. |
| 20 | 480 | |
| 30 | 550 | Shut off heat. |
| 35 | 440 | |
| 40 | 390 | |
| 70 | 200 | |
| 75 | 175 | Stopped agitation. |

1 part of phenyl α-naphthylamine was added as an oxidation inhibitor when the grease had cooled to 250° F.

Part C.—A portion of the grease prepared above in Part B was homogenized while at a temperature of about 100° F. by passage through a Morehouse mill operating at a 0.003″ opening to thereby give a relatively low rate of shear.

Part D.—A portion of the Morehouse milled grease of Part C was roll milled while at a temperature of about 100° F. using a roll opening space of 0.001″ to thereby give a relatively high rate of shear and form the final grease product of Example I.

EXAMPLE II

A sample of the final grease product of Example I, Part D, was further homogenized in a Manton-Gaulin homogenizer operating at 10,000 p.s.i. pressure to result in a shear of about 500,000 reciprocal seconds. After Gaulin homogenizing, the grease was then further diluted with an equal amount of mineral lubricating oil of 55 SUS viscosity at 210° F. The compositions of the greases of Examples I and II are summarized in the following table along with their more pertinent properties.

TABLE I

| | Greases | | | |
|---|---|---|---|---|
| | Example I | | | Example II |
| Composition (Wt. Percent): | | | | |
| Dodecanedioic dinitrile | 10.0 | | | 5.0 |
| Hydrofol Acids 51 | 10.0 | | | 5.0 |
| Glacial Acetic Acid | 4.0 | | | 2.0 |
| Sodium Hydroxide | 6.0 | | | 3.0 |
| Phenyl-naphthylamine | 1.0 | | | 0.5 |
| Mineral Lubricating Oil, 55 SUS at 210° F. | 69.0 | | | 84.5 |
| Properties: | Part B, Unmilled | Part C, Morehouse Milled | Part D, Roll Milled | |
| Appearance | Smooth | Smooth and glossy. | Smooth and glossy. | (3) |
| Dropping Point, °F | 500+ | 500+ | 500+ | 450 |
| ASTM Penetration 77° F., mm./10: | | | | |
| Unworked | 330 | 260 | 210 | 300 |
| Worked 60 Strokes | 320 | 265 | 215 | 310 |
| Worked 10,000 Strokes | 315 | 265 | 225 | 315 |
| Wheel Bearing Test, 220° F | Pass | Pass | Pass | |
| Water Washing-Cold Water [1] | 20% Leakage | 10% Leakage | 10% Leakage | |
| Norma Hoffmann Oxidation, Hours to 5 p.s.i. drop. | 2.0 | | | |
| Lubrication Life,[2] Hours: | | | | |
| 250° F.-10,000 r.p.m | 2,000+ | | | 2,000+ |
| 300° F.-10,000 r.p.m | 2,000+ | | | |

[1] ASTM D 1264-53T.
[2] ABEC-NLGI Spindle Test.
[3] Smooth, excellent appearance.

In the greases of Examples I and II, a portion of the dodecane dinitrile probably remained unchanged and served as a plasticizer and dispersant, while another portion of the dodecane dinitrile was probably converted to sodium salt as indicated by the following reaction:

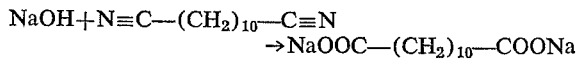

and/or

It appears that any base above the amount necessary to neutralize the acetic and hydrofol acids is used up in reaction with the dinitrile. Parts B, C, and D illustrate the hardening of the grease under shear resulting from the milling. This ability to harden so drastically under shear is believed to be due to the presence of sodium salt of dicarboxylic acid.

To further demonstrate the outstanding utility of the greases of the invention for bearing lubrication, a bearing temperature rise test was carried out as follows:

204 seven ball bearing was packed with 3.0 grams of the grease of Example I, Part B and the bearing was then operated at 10,000 r.p.m. while the temperature of the grease in the bearing was continuously measured by thermocouples placed on the outer bearing race.

In comparison, a commercial sodium salt bearing grease grease was also run in the above bearing test. This commercial grease consisted of mineral lubricating oil thickened with a sodium mixed-salt thickener prepared by coneutralizing with NaOH a mixture of stearic acid and acetic acid, followed by heating until dehydrate and of satisfactory soap dispersion. This commercial grease contained a small amount of anti-oxidant.

The results of the bearing test are summarized in Table II which follows:

TABLE II.—BEARING TEMPERATURE RISE—10,000 R.P.M.

| | Example I- Part B, °F. | Comparison Typical Sodium Soap Grease, °F. |
|---|---|---|
| Ambient Temperature | 70 | 70 |
| Start | 70 | 70 |
| 2 Min. Running | 100 | 150 |
| 5 Min. Running | 130 | 185 |
| 10 Min. Running | 85 | 185 |
| 24 Hours | 85 | 187 |
| Power Requirement | Low | High |

As seen by Table II above, the grease prepared from the dodecanedioic dinitrile showed an initial temperature rise up to 130° F. during the first five minutes of operation, but then quickly fell off to 85° F. This indicates that during the first few minutes of operation, some slight churning of the grease occurred, but the grease quickly formed a channel for the rotating balls with a resultant drop in temperature. On the other hand, the commercial bearing grease rose to 185°–187° F. and maintained this temperature, thus indicating continuous churning. As a result of this churning more power was required to operate the bearing running on the commercial grease than was required to operate the grease of the invention. This increased power requirement is of course wasted, since it performs no useful work.

EXAMPLE III

A lubricating grease composition was prepared as follows:

10 parts of hydrofol acids 51, 5 parts of dodecanedioic acid and parts of mineral lubricating oil of 55 SUS viscosity at 210° F., were added to a grease kettle and heated to 150° F. 4 parts of glacial acetic acid was next added, followed immediately by the addition of 6 parts of sodium hydroxide which were added in the form of a 40 wt. percent sodium hydroxide in 60 wt. percent of water. The reaction mixture was then heated at 450° F. for about 2 hours. Heating was discontinued and the grease was allowed to cool to 250° F. where 1 part of phenyl-alpha-naphthylamine was added as an oxidation inhibitor, after which the grease was further cooled to 150° F. 5 parts of dodecanedioic dinitrile was then added and the grease was homogenized in a Charlotte mill and packaged.

*Comparison grease—No dinitrile in formulation*

A grease was prepared by adding 10 parts of dodecanedioic acid, 16 parts of hydrofol acids 51 and 66.5 parts of mineral lubricating oil of 55 SUS viscosity at 210° F. to a fire-heated grease kettle and warmed to 150° F. while stirring. 4 parts of glacial acetic acid was then added, followed immediately by the addition of 8.5 parts of sodium hydroxide in the form of a 40% concentrate of sodium hydroxide and 60 wt. percent water. Heating was continued and the temperature of the composition raised to 450° F. which was held for about two hours. Heating was then discontinued and the grease was allowed to cool to 250° F., where 1 wt. percent of phenyl-alpha-naphthylamine was added, after which the grease was further cooled to 100° F. The rather rough textured grease product was then Morehouse milled. After milling, the grease still retained a somewhat rough texture.

EXAMPLE IV

*Dinitrile in formulation*

A grease was prepared in the same general manner as that of the comparison grease just described, except that 2 parts of dodecanedioic dinitrile was used in place of 2 parts of dodecanedioic acid.

The compositions of Examples III and IV, the comparison grease, and their properties are summarized in Table III which follows:

TABLE III

| Formulation | Examples | | |
|---|---|---|---|
| | III | Comparison | IV |
| Dodecanedioic Acid | 5.0 | 10.0 | 8.0 |
| Dodecanedioic dinitrile | 5.0 | | 2.0 |
| Hydrofol Acids 51 | 10.0 | 10.0 | 10.0 |
| Glacial Acetic Acid | 4.0 | 4.0 | 4.0 |
| Sodium hydroxide | 6.0 | 8.5 | 8.5 |
| Phenyl α-Naphthylamine | 1.0 | 1.0 | 1.0 |
| Mineral Lubricating Oil of 55 SUS at 210° F | 69.0 | 66.5 | 66.5 |
| Properties: | | | |
| Appearance | (1) | Rough | Smooth |
| Dropping Point, ° F | 500+ | 500+ | 500+ |
| ASTM Penetration 77° F. mm./10: | | | |
| Unworked | 285 | 200 | 210 |
| Worked 60 strokes | 300 | 245 | 250 |
| Worked 10,000+ strokes | 310 | 251 | 255 |
| Wheel Bearing Test, 220° F | | (2) | (3) |
| Water Washing Test, Loss percent | | 40 | 20 |
| Norma Hoffmann Oxidation, Hours to a 5 p.s.i. drop in O₂ Press | 175 | 200 | 200 |
| Lubrication Life, 10,000 r.p.m., 250° F | 2,000+ | 2,000+ | 2,000+ |
| Bearing Temperature Rise, ° F., 10,000 r.p.m.: | | | |
| Start | 75 | 70 | 70 |
| 5 Minutes | | 130 | 145 |
| 10 Minutes | | 85 | 85 |
| 30 Minutes | 160 | | |
| 2 Hours | 160 | | |
| 24 Hours | 145 | 85 | 85 |
| 6 Days | 90 | | |

1 Excellent, smooth grease.
2 Pass, No Slump.
3 Pass, No Leakage.

As seen by Table III, the dinitrile of Example III very slowly reacted to form salt as indicated by the slow change from a non-channeling grease to a channeling-type grease at the end of 6 days operation in the 204 bearing. Apparently, the dinitrile hydrolyzed and reacted with the excess sodium hydroxide to primarily make the disodium salt of dodecanedioic acid. Example IV and the Comparison were both channeling greases as seen by the low temperature of the bearing after 10 minutes operation. However, the Comparison, which contained no dinitrile, had a rough coarse appearance, while the grease of Example IV containing the dinitrile was smooth and homogeneous, thus illustrating the plasticizing effect of the dinitrile. Also, Example III illustrates that when the dinitrile is added at low temperatures (e.g., at 150° F. in Example III) to a grease, the dinitrile is not quickly converted to the metal salt, but rather very gradually changes to said salt when used in a bearing. On the other hand, when the dinitrile is heated to a high temperature (as in Example I with excess metal base present, the dinitrile is quickly converted to its metal carboxylic acid salt derivative. It is thus seen, that by regulating: (1) the amount of metal base present, the extent to which the dinitrile is converted to salt can be controlled and (2) by determining the temperature at which the dinitrile is added to the grease reaction mixture the rate with which the grease shear hardens can be controlled. Thus, depending on the end use, greases can now be designed which can shear harden to a degree of hardness in a desired time. Thus, the dinitrile offers the grease-maker a new and valuable tool in making grease. In addition, the dinitrile acts as an anti-oxidant. Thus, the grease of Example IV, without the 1 part of phenyl-alpha-naphthylamine, ran over 1,000 hours in the 204 bearing test, while similar sodium greases without either the nitrile or an oxidation inhibitor usually fail in about 300 hours in said bearing test.

To further illustrate the invention, 3 wt. percent of octadecane dinitrile can be added by simple mixing at 77° F. to a grease consisting of mineral oil and 15 wt. percent of calcium stearate.

What is claimed is:

1. A lubricating grease comprising a major amount of mineral lubricating oil, 10 to 45 wt. percent of sodium mixed salts of acetic acid and $C_7$ to $C_{30}$ fatty, and 0.1 to 10 wt. percent of an aliphatic dinitrile of the general formula:

$$N \equiv C-(CH_2)_n-C \equiv N$$

wherein $n$ is an integer of 8 to 20, said salts being prepared by neutralizing said acids in a weight ratio of about 0.1 to 10 parts of acetic acid per part of said dinitrile, and about 0.1 to 20 parts of said fatty acid per part of said dinitrile.

2. A lubricating grease according to claim 1, wherein said dinitrile is dodecanedioic dinitrile.

3. A lubricating grease according to claim 1, wherein said weight ratio is about 0.2 to 4.0 parts of said acetic acid per part of said dinitrile and about 0.5 to 10 parts of said $C_7$ to $C_{30}$ fatty acid per part of said dinitrile, wherein $n$ is 8 to 20, wherein the amount of said dinitrile is about 0.5 to 5.0 wt. percent, and wherein the amount of said sodium mixed salts is about 10 to 35 wt. percent.

4. A lubricating grease according to claim 1, which contains unreacted sodium hydroxide in a amount sufficient to form sodium salt of a carboxylic acid derivative of said dinitrile upon hydrolysis of said dinitrile.

5. A lubricating grease comprising a major amount of lubricating oil, about 10 to 45 wt. percent of metal salt of aliphatic carboxylic acid as a thickener, said carboxylic acid being selected from the group consisting of $C_{13}$ to $C_{30}$ fatty acids and $C_9$ to $C_{16}$ saturated aliphatic dicarboxylic acids, and about 0.1 to 10.0 wt. percent of an aliphatic dinitrile of the general formula:

$$N\equiv C-(CH_2)_n-C\equiv N$$

wherein $n$ is 8 to 30, wherein said metal is selected from the group consisting of alkali metals and alkaline earth metals.

6. A grease according to claim 5, which includes metal base to hydrolyze and convert at least a portion of the dinitrile present into metal salt of carboxylic acid.

References Cited by the Examiner
UNITED STATES PATENTS

| | | | |
|---|---|---|---|
| 1,856,186 | 5/1932 | Hofmann et al. | 252—405 |
| 2,134,306 | 10/1938 | Walther | 252—405 |
| 2,882,232 | 4/1959 | Haines et al. | 252—50 |
| 3,013,974 | 12/1961 | Morway et al. | 252—39 |
| 3,133,953 | 5/1964 | Ichiro et al. | 260—465.8 |
| 3,139,451 | 6/1964 | Dexter et al. | 252—50 |

DANIEL E. WYMAN, *Primary Examiner.*